United States Patent [19]

Aoki

[11] Patent Number: 6,069,723
[45] Date of Patent: May 30, 2000

[54] MULTI-BEAM SCANNING APPARATUS WITH CONTROLLED SCAN LINE BOW

[75] Inventor: Magane Aoki, Kanagawa, Japan

[73] Assignee: Ricoh Company, Ltd., Tokyo, Japan

[21] Appl. No.: 08/916,959

[22] Filed: Aug. 25, 1997

[30] Foreign Application Priority Data

Aug. 26, 1996 [JP] Japan ..................................... 8-223787
Apr. 17, 1997 [JP] Japan ..................................... 9-100454

[51] Int. Cl.⁷ .................................................. G02B 26/08
[52] U.S. Cl. ......................... 359/204; 359/205; 359/208; 347/241; 347/243; 347/244
[58] Field of Search ................................... 359/204, 205, 359/208; 347/241, 243, 244

[56] References Cited

U.S. PATENT DOCUMENTS 5,512,949  4/1996  Fisli et al. ................................ 359/204
5,517,330  5/1996  Maeda ..................................... 359/204

*Primary Examiner*—Darren E. Schuberg
*Attorney, Agent, or Firm*—Oblon, Spivak, McClelland, Maier & Neustadt, P.C.

[57] ABSTRACT

A multi-beam scanning apparatus includes a light source unit for emitting a plurality of beams, a beam deflector for deflecting the plurality of beams from the light source unit, and a common scanning image-forming optic for converging the plurality of deflected beams so as to form a plurality of beam spots for simultaneously scanning a scanned surface, a plurality of scan lines respectively described by the plurality of beam spots being isolated from each other in a sub-scanning direction, wherein the plurality of scan lines are bowed in the same direction.

10 Claims, 11 Drawing Sheets

(C-1)

(C-2)

MULTI-BEAM SCANNING APPARATUS WITH CONTROLLED SCAN LINE BOW

BACKGROUND OF THE INVENTION

1. Field of the Invention

The present invention generally relates to multi-beam scanning apparatuses and, more particularly, to a multi-beam scanning apparatus in which high-quality image is assured by controlling the scan line bow.

2. Description of the Related Art

Conventionally, a single-beam optical scanning apparatus for writing an image by optically scanning a scanned surface with a single deflected beam is widely known as an image forming apparatus for optical printers and the like. Recently, multi-beam optical scanning apparatuses for simultaneously scanning a scanned surface with a plurality of beams for the purpose of improving image writing speed are being developed.

In the single-beam scanning method, a beam emitted by a light source is guided toward a beam deflector such that a chief ray coincides with an optical axis of the optical system. The chief ray of the beam is deflected by the beam deflector on a plane that includes an optical axis of a scanning image-forming optic such as an fΘ lens. In the single-beam scanning apparatus, a scan line (a track of a beam spot) is hardly curved. That is, no scan line bow is created.

In the multi-beam scanning method, however, an optical path of some of a plurality of beams traveling from respective light sources to the scanned surface is displaced with respect to an optical axis of the optical system in a direction (hereinafter, referred to as an unfolded sub-scanning direction) corresponding to a direction that matches the sub-scanning direction when the optical path from the light source to the scanned surface is unfolded. The scan line described by the beam displaced with respect to the optical axis is not straight. That is, a scan line bow is created.

FIGS. 1A and 1B show how four beams from respective light sources produce four beam spots providing four scan lines S1–S4 on a scanned surface. The dashed line A indicates a reference scan line produced when a chief ray of a deflected beam is deflected on a plane which includes an optical axis of a scanning image-forming optic and which is parallel with a direction (hereinafter, referred to as an unfolded main-scanning direction) corresponding to a direction that matches the main-scanning direction when the optical path from the light source to the scanned surface is unfolded. The reference scan line A corresponds to the scan line produced in the single-beam scanning arrangement and is therefore free of bow.

In the example shown in FIG. 1A, the scan lines S1–S4 lie side by side in the sub-scanning direction (vertical direction on the paper) such that the scan lines S1 and S2 are symmetrical with the scan lines S4 and S3, respectively, with respect to the reference scan line A. The scan lines S1 and S2 are bowed toward the top of the paper and the scan lines S3 and S4 are bowed toward the bottom of the paper. FIG. 1A shows how two scanning processes B1 and B2 each using four beam spots simultaneously are successively performed. Optical writing is performed such that the scanning processes B1 and B2 are alternately repeated.

Referring to the area I, a small interval (scan line pitch) is created between the scan line S4 in the scanning process B1 and the scan line S1 in the scanning process B2. In the area II, a large scan line pitch is created between the scan lines S2 and S3. As a result, there is produced a periodical variation in density of the optically-written image in the sub-scanning direction, near the center of the extent of main-scanning. Thereby, image quality is degraded.

FIG. 1B shows how a scanning process Cl using four beam spots is followed by a scanning process C2. The scan lines S1–S4 lie side by side in the sub-scanning direction such that the scan lines S1 and S2 are symmetrical with the scan lines S4 and S3, respectively, with respect to the reference scan line A. The scan lines S1–S4 are slightly bowed away from the reference scan line A at two locations along the extent of main-scanning (left-to-right direction on the paper) and are bowed toward the reference line A at the center of the extent of main-scanning. The scan line S1 is bowed with a larger radius of curvature than the scan line S2. The scan line S4 is bowed with a larger radius of curvature than the scan line S3.

Sine the scan line S4 of the scanning process C1 and the scan line S1 of the scanning process C2 are bowed in opposite directions, a large scan line pitch is created in the area III and a small scan line pitch is created in the area IV. As a result, there is produced a variation in density of an optical-written image in the main-scanning direction, at a boundary between two successive scanning processes C1 and C2. Thereby, image quality is degraded.

A variation in scan line pitches occurring in a multi-beam scanning apparatus due to curvature of the scan lines, will be referred to as a differential pitch. As described above, differential pitch causes the quality of the optically-written image to be degraded.

One approach to reduce the differential pitch is disclosed in Japanese Laid-Open Patent Application No. 7-199109. In this approach, a scanning image-forming optic is designed to produce curvature of field. While producing curvature of field reduces differential pitch, it also causes a large variation in beam spot size on a scanned surface depending on image height. The beam spot size becomes relatively large where the image height is relatively large. Thereby, image quality is again degraded.

SUMMARY OF THE INVENTION

Accordingly, an object of the present invention is to provide a multi-beam scanning apparatus in which the aforementioned problem is eliminated.

Another and more specific object is to provide a multi-beam scanning apparatus in which differential pitch is successfully reduced without causing a large variation in beam spot size.

In order to attain the aforementioned objects, the present invention provides a multi-beam scanning apparatus comprising: light source means for emitting a plurality of beams; beam deflector means for deflecting the plurality of beams from the light source means; and common scanning image-forming optic for converging the plurality of deflected beams so as to form a plurality of beam spots for simultaneously scanning a scanned surface, a plurality of scan lines respectively described by the plurality of beam spots being isolated from each other in a sub-scanning direction, wherein the plurality of scan lines are bowed in the same direction.

For example, the scan lines S1 and S2 in FIG. 1A are bowed in the same direction. The scan lines S1 and S2 in FIG. 1B are also described as being bowed in the same direction in that they are curved in an identical direction at an identical image height. By this definition, the scan lines S2 and S3 in FIG. 1A are described as being bowed in opposite directions. In the example shown in FIG. 1A, the scan lines S1 and S2 of the four scan lines S1–S4 are bowed in the same direction, and the scan lines S3 and S4 are bowed in the same direction. The direction of bow of the scan lines S1 and S2 is opposite to the direction of bow of the scan lines S3 and S4.

Assuming that the number of scan lines resulting from simultaneous scanning is n (>1), the present invention ensures that all of the n scan lines are bowed in the same direction.

As has been described with reference to FIGS. 1A and 1B, scan line pitch deviation occurs as a result of the adjacent scan lines being bowed to opposite directions. According to the present invention, scan line pitch deviation can be successfully reduced by ensuring that the n scan lines described by simultaneous scanning are bowed in the same direction.

Since it is not necessary to introduce a curvature of field for the purpose of reducing scan line pitch deviation, the beam spot size does not vary significantly depending on the image height.

The common image-forming optic could be a lens system such as an fΘ lens. In order to ensure that a plurality of scan lines described by a plurality of beam spots are bowed in the same direction, the chief rays of all the beams emitted by the light sources are made to reside on the same side with respect to the optical axis all along the optical path from the light source to the scanned surface.

The scanning image-forming optic may be provided with a reflecting image-forming element having an image-forming function, so that the plurality of deflected beams deflected by the common beam deflector means are incident on the reflecting image-forming element and reflected thereby. The reflecting image-forming element may be arranged so that an optical path of a reflecting beam does not overlap an optical path of an incident beam.

More specifically, the reflecting image-forming element may be arranged such that the reflecting surface thereof is tilted in the unfolded sub-scanning direction with respect to the direction of incidence of the incident beam by rotating the reflecting image-forming element around an axis parallel with the unfolded main-scanning direction, and so that the reflecting image-forming element is shifted in the unfolded sub-scanning direction maintaining its orientation. By providing the reflecting image-forming element with an appropriate tilt and a shift, it is ensured that a plurality of scan lines are bowed in the same direction.

In the multi-beam scanning apparatus, an optical element having a power at least in the sub-scanning direction may be provided between the reflecting image-forming element and the scanned surface. Such an element may be embodied by a cylinder lens, a toric lens or a lens of other variations (for example, a deformed barrel-surfaced toric lens) having a power in the unfolded sub-scanning direction.

The plurality of beam spots may simultaneously describe mutually adjacent scan lines.

BRIEF DESCRIPTION OF THE DRAWINGS other objects and further features of the present invention will be apparent from the following detailed description when read in conjunction with the accompanying drawings, in which.

DESCRIPTION OF THE PREFERRED EMBODIMENTS

Figure 1A:
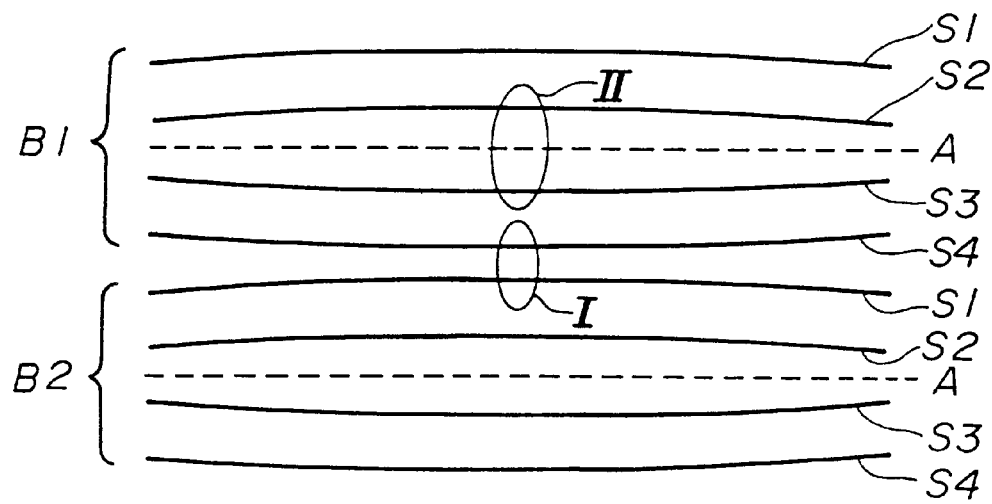
FIGS. 1A and 1B show how four beams from respective light sources produce four beam spots providing four scan lines on a scanned surface.
Figure 1B:
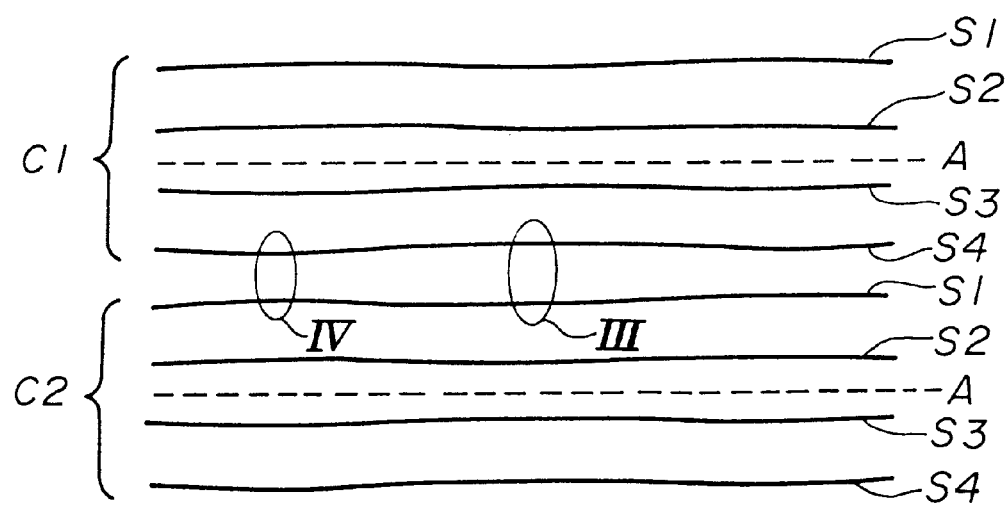
Figure 2A:
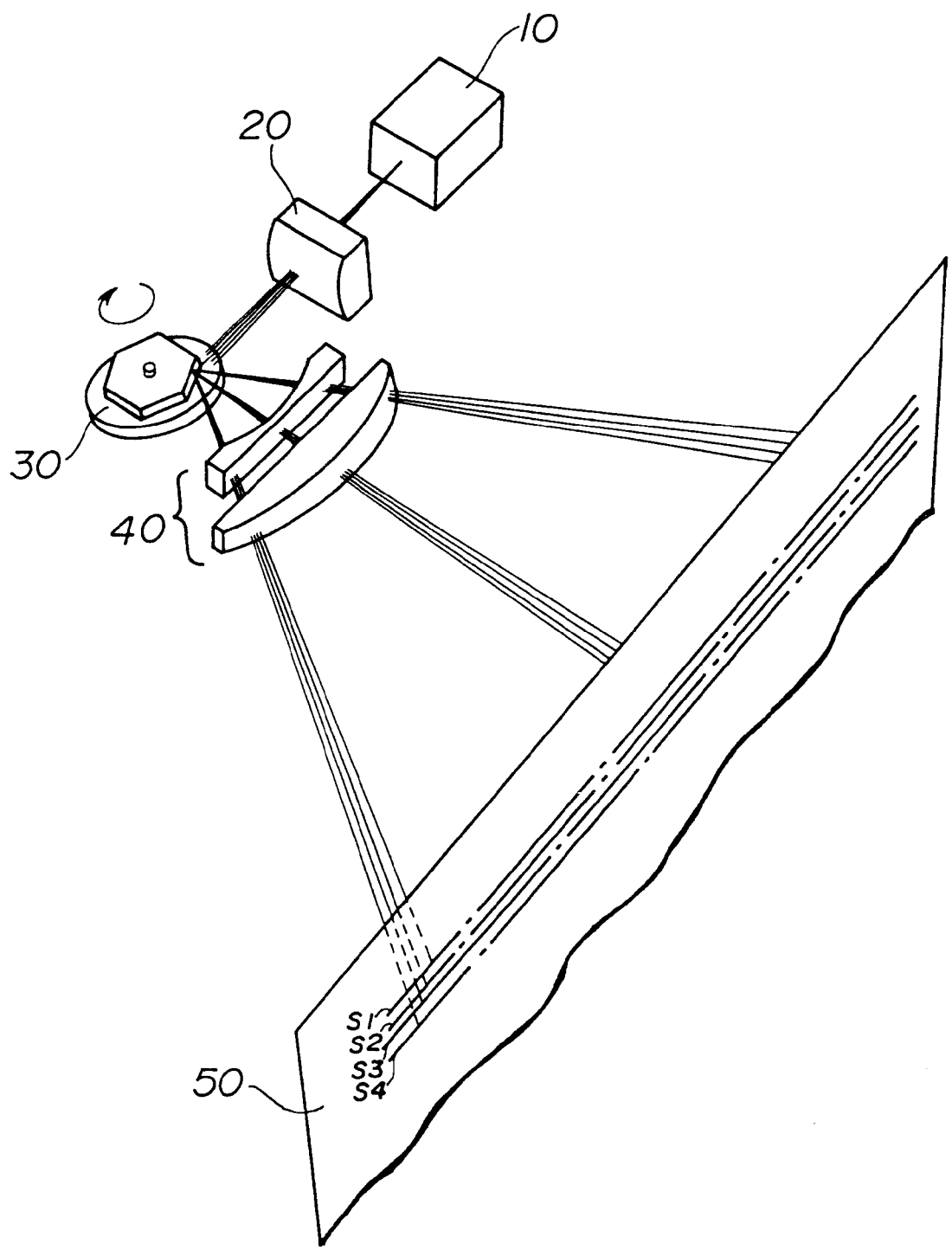
FIG. 2A shows a multi-beam scanning apparatus according to a first embodiment of the present invention.
Figure 2B:
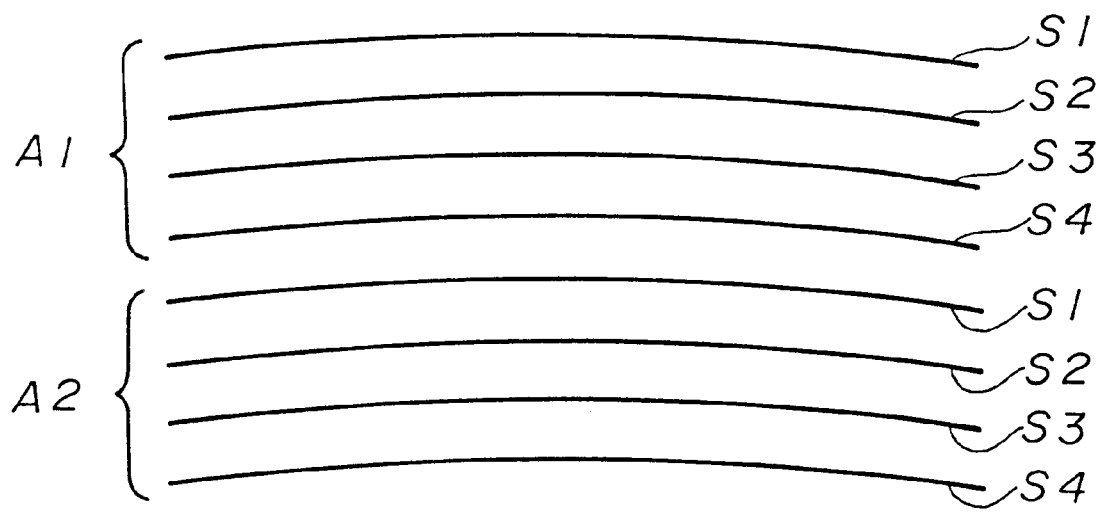
FIG. 2B shows how scan lines are arranged in the multi-beam scanning apparatus of FIG. 2A.

FIG. 2A shows a multi-beam scanning apparatus according to a first embodiment of the present invention. FIG. 2B shows how scan lines are arranged in the multi-beam scanning apparatus of FIG. 2A.

Referring to FIG. 2A, four parallel beams are emitted from a light source unit 10. The four beams are converged in the sub-scanning direction by a cylinder lens 20 embodying a line-image-forming optic so as to form an image elongated in the main-scanning direction in the neighborhood of a deflecting and reflecting surface of a polygon mirror 30 embodying a common beam deflector as claimed.

The four beams are deflected by the polygon mirror 30 so as to be incident on an fΘ lens 40 embodying a common scanning image-forming optic as claimed. The beams are converged by the fΘ lens 40 so as to form four sagittally (in the sub-scanning direction) separated beam spots for scanning a scanned surface 50. Since a photosensitive body provided with photoconductive characteristic is provided on the scanned surface 50, the four beam spots substantially scan the photosensitive body simultaneously.

The chief rays of the four beams are configured to lie on the same side of the optical axis of the apparatus all along an optical path extending from the light source unit 10 to the scanned surface 50. For this reason, the four scan lines S1–S4 produced by the four beam spots are bowed in the same direction.

Referring to FIG. 2B, a scanning process Al using the four beam spots simultaneously is followed by a scanning process A2 such that the scan lines S–S4 are bowed in the same direction. Thus, differential scan line pitch is successfully reduced so that degradation, due to differential pitch, in quality of image produced by alternately repeating the scanning processes A1 and A2 is prevented.

The multi-beam scanning apparatus of FIG. 2A is provided with facet-inclination-correction function. The scanning image-forming optic may be appropriately designed so that the beams emitted from the light source unit 10 are slightly diverging or slightly converging.

Figure 3A:
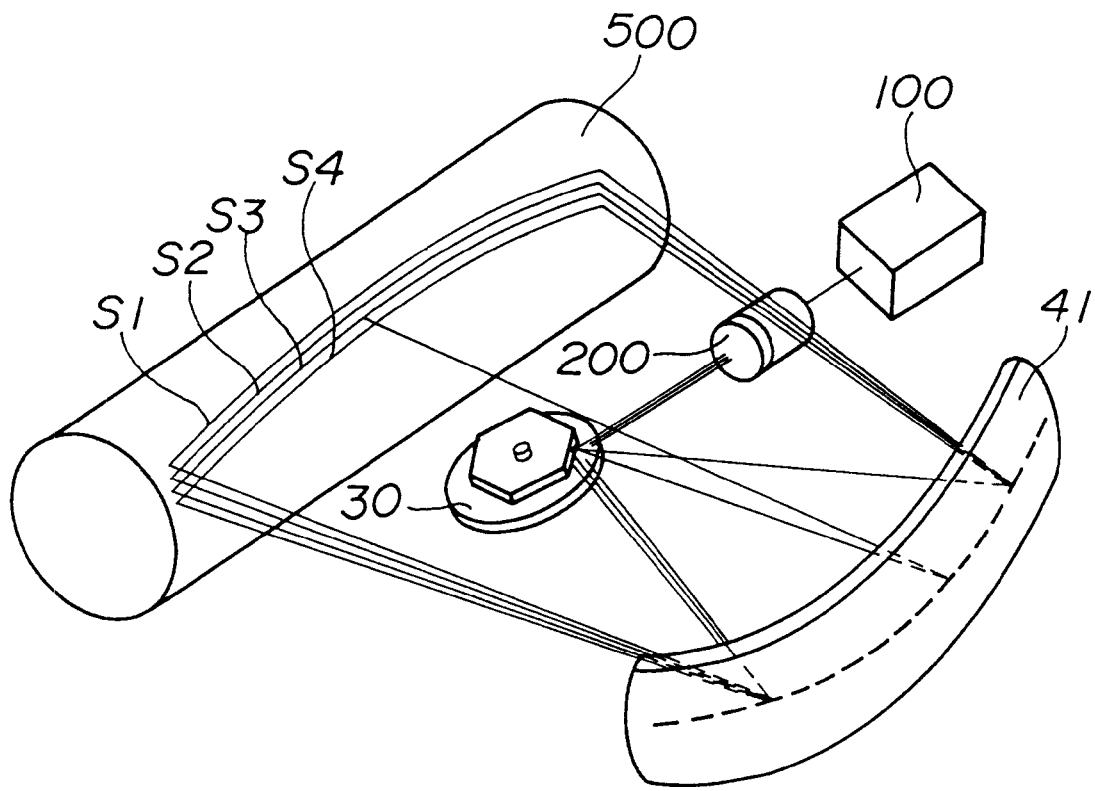
FIG. 3A shows an multi-beam scanning apparatus according to a second embodiment of the present invention.
Figure 3B:
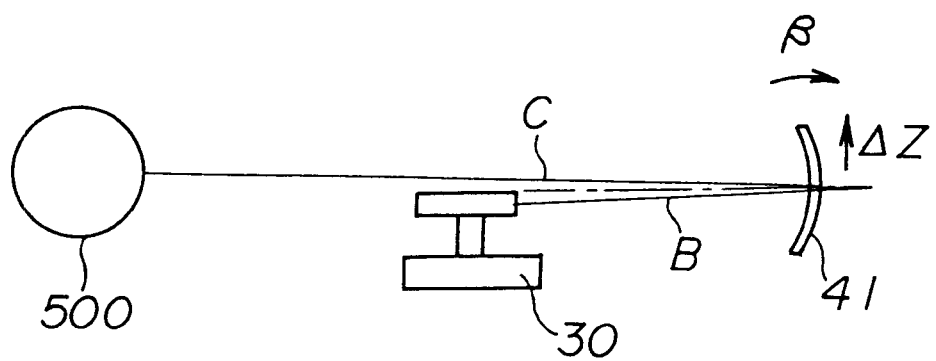
FIG. 3B is a sagittal section showing an optical path in the multi-beam scanning apparatus of FIG. 3A.

FIG. 3A shows an multi-beam scanning apparatus according to a second embodiment of the present invention. FIG. 3B is a sagittal section showing an optical path in the multi-beam scanning apparatus of FIG. 3A.

Referring to FIG. 3A, four beams emitted from a light source unit 100 are transformed into parallel beams by a common collimating lens 200. The collimated beams are deflected by the polygon mirror 30 embodying the common beam deflector as claimed. The deflected beams are reflected by a concave mirror 41 embodying a reflecting image-forming element as claimed provided with image-forming function. The concave mirror 41 will be referred to as an fΘ mirror because it has an function of providing constant-velocity main scanning. The fΘ mirror 41 is an anamorphic image-forming optic having different image-forming power in the main-scanning direction and in the sub-scanning direction. The fΘ mirror 41 converges the four beams so as to form four sagittally separated beam spots on a photosensitive body 500 (scanned surface) provided with photoconductive characteristic. The four beam spots simultaneously scan the scanned surface so as to produce the four scan lines S1, S2, S3 and S4.

FIG. 3B is a sagittal section showing an optical path from the polygon mirror 30 to the photosensitive body 500. As shown in FIG. 3B, the fΘ mirror 41 (reflecting image-forming element) is tilted at an angle β and displaced from the optical axis by a distance Δz so that an optical path of a reflecting beam C does not overlap an optical path of an incident beam B. With this arrangement, the four scan lines S–S4 are bowed in the same direction so that differential pitch is successfully reduced.

Figure 4A:
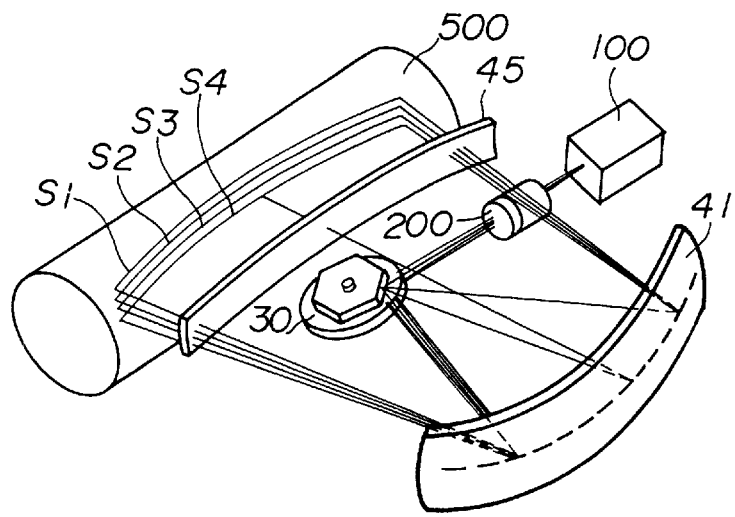
FIG. 4A shows an multi-beam scanning apparatus according to a third embodiment of the present invention.

FIG. 4A shows a multi-beam scanning apparatus according to a third embodiment of the present invention.

Figure 4B:
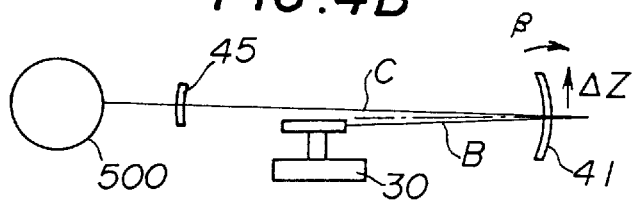
FIG. 4B is a sagittal section showing an optical path in the multi-beam scanning apparatus of FIG. 4A.

Referring to FIG. 4B, four beams emitted from the light source unit 100 are transformed into parallel beams by the common collimating lens 200 and are simultaneously deflected by the polygon mirror 30. The deflected beams are then reflected by the fΘ mirror 41 and converged onto the photosensitive body 500 via a elongated toroidal lens 45 (embodying an optical element having a power at least in the sub-scanning direction as claimed) provided for facet-inclination correction.

Convergence is effected by the fΘ mirror 41 and the elongated toroidal lens 45. The converged four beams form four sagittally separated beam spots for simultaneously scanning the photosensitive body 500, thus producing the four scan lines S1, S2, S3 and S4 on the scanned surface.

FIG. 4B is a sagittal section showing an optical path from the polygon mirror 30 to the photosensitive body 500. Referring to FIG. 4B, the fΘ mirror 41 is tilted at an angle β and displaced from the optical axis by a distance Δz so that an optical path of the reflecting beam C does not overlap an optical path of the incident beam B. With this arrangement, the four scan lines S1–S4 are bowed in the same direction so that differential pitch is successfully reduced.

Figure 4C:
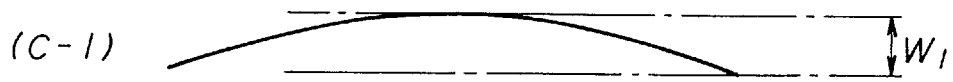
FIG. 4C shows how scan line bow of the second embodiment differs from that of the third embodiment.
Figure 4C:
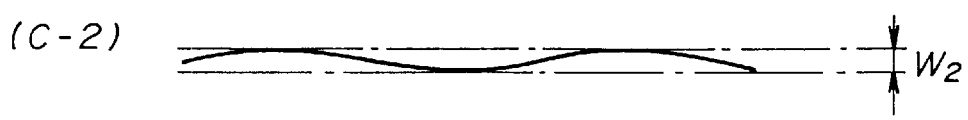

FIG. 4C shows how scan line bow of the second embodiment differs from that of the third embodiment. (C-1) of FIG. 4C shows scan line bow of the second embodiment and (C-2) of FIG. 4C shows scan line bow of the third embodiment. In the second embodiment, the bow of the scan lines S1–S4 occurs only in one direction, resulting in a "simple-convex" configuration. The dual-convex configuration of the scan line bow of (C-2) results from an action of the elongated toroidal lens 45. The curvature $W_1$ of the scan line of (C-1) is larger than the curvature $W_2$ of the scan line of (C-2).

Figure 4D:
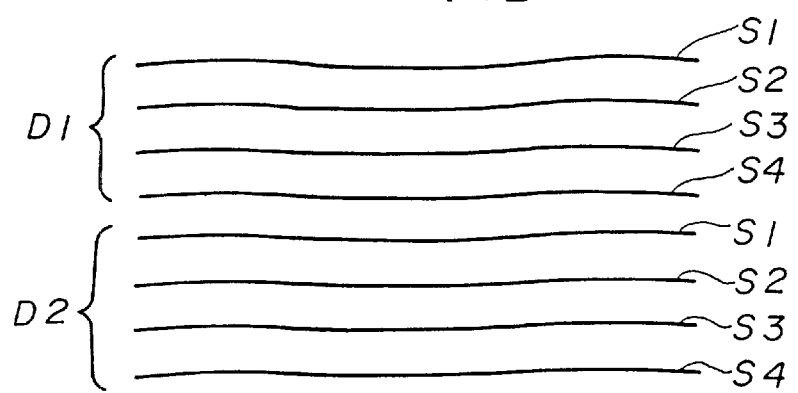
FIG. 4D shows how scan lines are arranged in the multi-beam scanning apparatus of FIG. 4A.

FIG. 4D shows how scan lines are arranged in the multi-beam scanning apparatus of FIG. 4A. Referring to FIG. 4D, a scanning process D1 using the four beam spots simultaneously is followed by a scanning process D2 such that the scan lines S1–S4 are bowed in the same direction. Thus, differential scan line pitch is successfully reduced so that degradation, due to differential pitch, in quality of image produced by alternately repeating the scanning processes D1 and D2 is prevented.

In the multi-beam scanning apparatus of FIGS. 3A and 4A, the collimating lens 200 could be replaced by a coupling lens so that the four beams from the light source unit 100 are slightly diverging or slightly converging.

In the first through third embodiments described above, it is assumed that the four scan lines produced as a result of simultaneous scanning of the scanned surface print adjacent to each other in an optically-written image. However, the plurality of scan lines described on the scanned surface in the multi-beam scanning apparatus need not print adjacent to each other in an optically-written image.

For example, each of the pitch between the scan lines S1 and S2, the pitch between the scan lines S2 and S3, and the pitch between the scan lines S3 and S4 could be an integral multiple of the scan line pitch on an optically-written image. However, if an interval between scan lines resulting from simultaneous scanning becomes large, degradation in optically-written image quality results even if the plurality of scan lines are bowed in the same direction.

Figure 5:
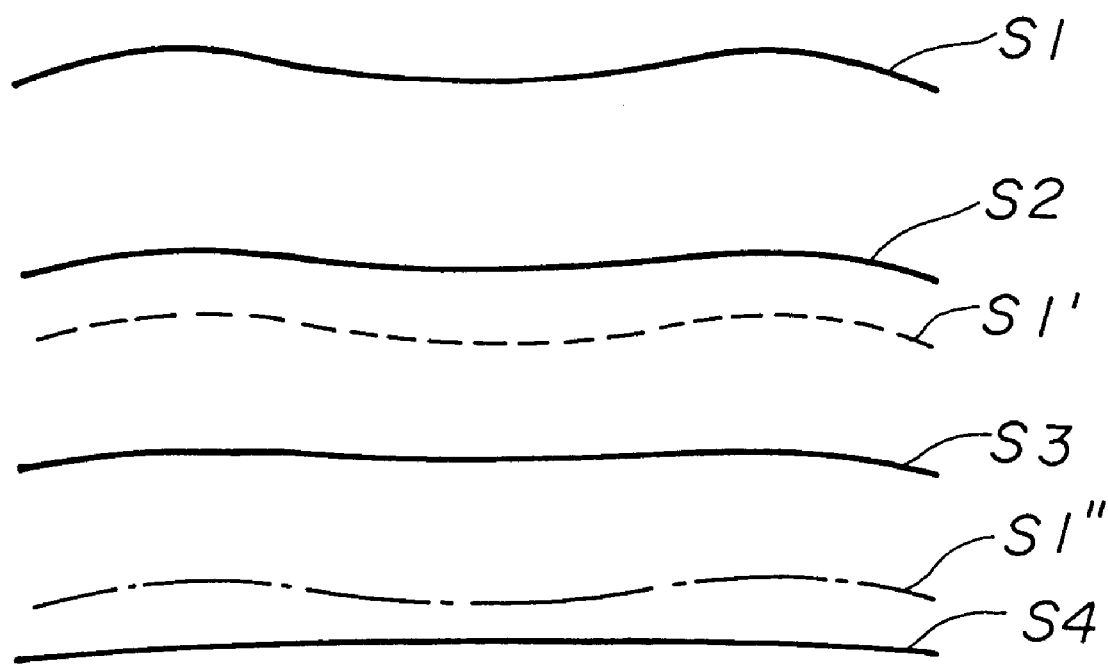
FIG. 5 shows interlace scanning having an interlace factor of 3.

FIG. 5 shows a case where the four scan lines S1–S4 resulting from simultaneous scanning are arranged such that each of the pitch between the scan lines S1 and S2, the pitch between the scan lines S2 and S3, and the pitch between the scan lines S3 and S4 is 3 times as large as the scan line pitch on an optically-written image. That is, FIG. 5 shows interlace scanning having an interlace factor of 3. As a result, an interval between the scan lines S1 and S4 is 9 times the scan line pitch on the image. While the scan lines S1–S4 are bowed in the same direction, the curvature thereof gradually increases such that the scan line S4 close to the optical axis of the scanning and image-forming optic is bowed to the smallest degree and the scan line S1 removed furthest away from the optical axis is bowed to the largest degree.

In the interlace scanning having a factor of 3 shown in FIG. 5, the beam spot producing the scan line S1 in the first scanning process produces the scan line S1' in the second scanning process and the scan line S1" in the third scanning process. In this case, significant differential pitch is produced between the scan line S1" and the scan line S4 along the extent of main-scanning.

Thus, it will be appreciated that, by ensuring that the scan lines resulting from simultaneous scanning print adjacent to each other in an optically-written image, differential pitch is successfully reduced.

Figure 6A:
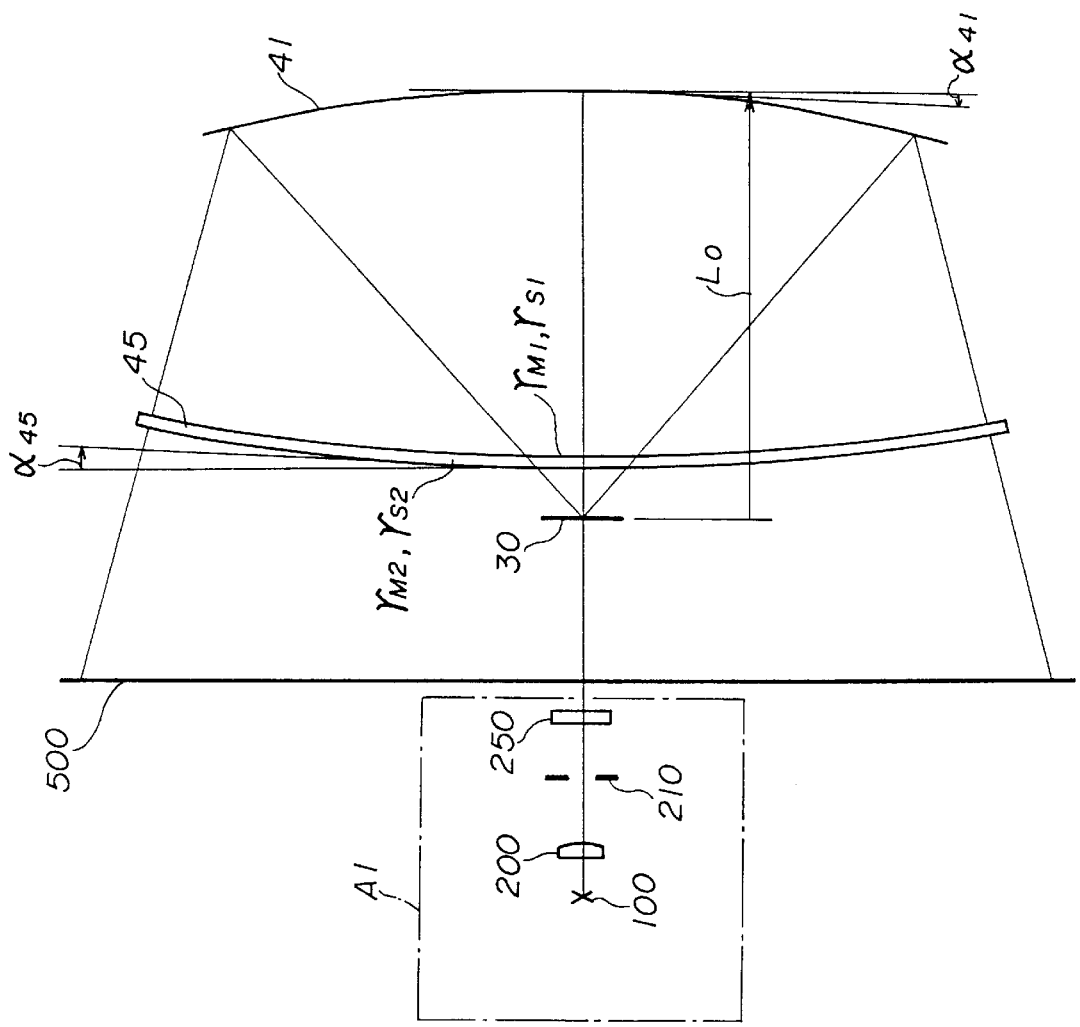
FIG. 6A is an unfolded tangential view of an optical layout according to a first arrangement of the third embodiment.
Figure 6B:
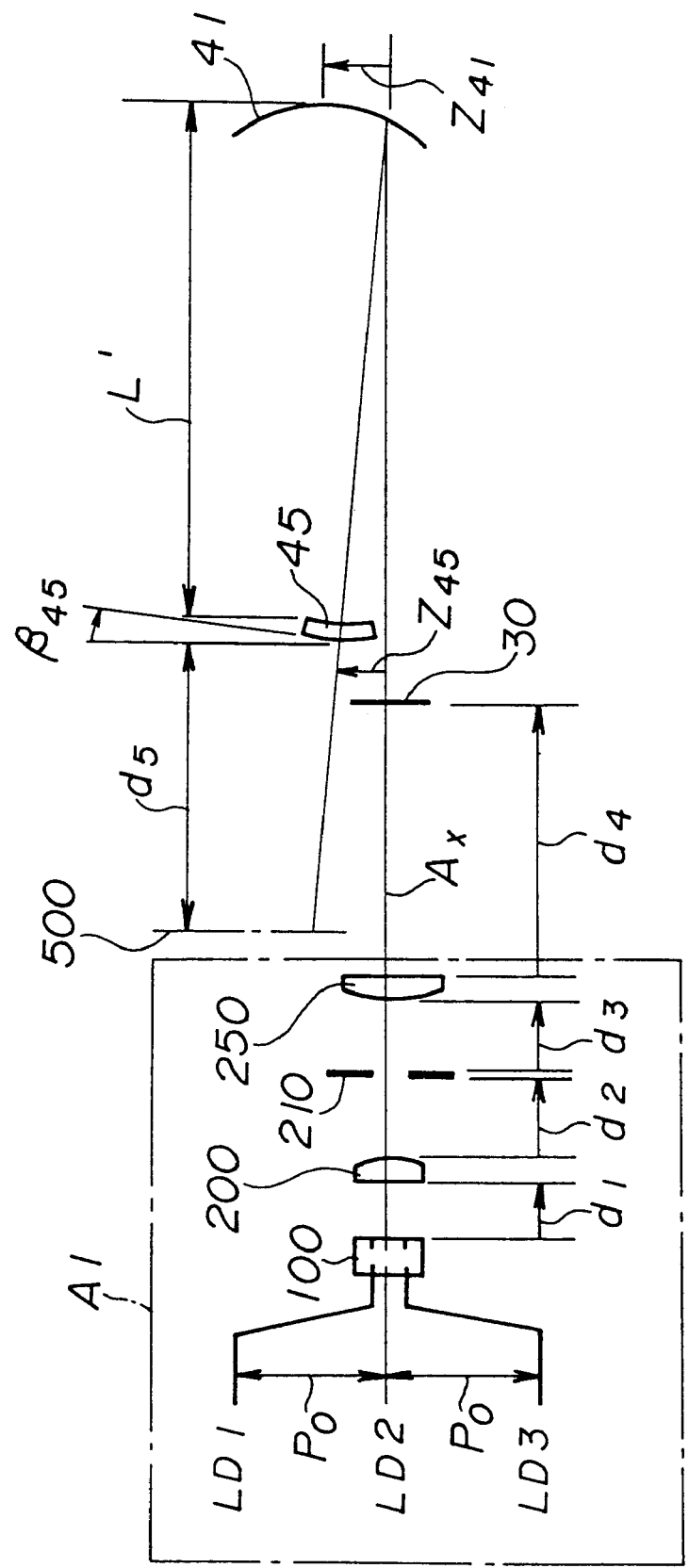
FIG. 6B is an unfolded sagittal view of an optical layout according to the first arrangement of the third embodiment.

A description will now be given of specific examples of arrangements in the third embodiment. FIG. 6A is a tangential view of an optical layout of the multi-beam scanning apparatus according to a first arrangement of the third embodiment. FIG. 6B is a sagittal view of the same. In FIG. 4A and FIGS. 6A and 6B, like elements are designated by like numerals, and the description thereof is omitted.

FIGS. 6A and 6B are unfolded views showing the optical path between the light source unit 100 and the fΘ mirror 41 straight and showing the optical path between the fΘ mirror 41 and the scanned surface (surface of the photosensitive body) 500 straight.

While it is assumed that the light source unit 100 of the apparatus of FIG. 4A is provided with four light sources, the light source unit 100 of the first arrangement of the third embodiment is provided with three light sources (light-emitting parts). In a second arrangement (described later) it is assumed that the light source unit 100 is provided with two light sources.

In the following description, the magnitude of length is represented in units of mm.

Referring to FIGS. 6A and 6B, the coupling lens 200 is a plano-convex lens wherein the surface thereof facing the light source unit 100 has a radius of curvature $r_{cp1}=\infty$ and the surface facing an aperture 210 has a radius of curvature $r_{cp2}=-10.2987$. The coupling lens 200 is also constructed such that the thickness $d_{cp}=3$, the refractive index $n_{cp}=1.712205$ and the focal length $f_{cp}=14.46$. The coupling lens 200 turns the beams from the light source 100 into generally parallel (slightly divergent) beams.

A cylinder lens 250 is a plano-convex lens wherein the surface thereof facing the aperture 210 has a radius of curvature $r_{cyl}=29.5$ and the surface facing the polygon mirror has a radius of curvature $r_{cp2}=\infty$. The cylinder lens 250 is also constructed such that the thickness $d_{cy}=3$ and the refractive index $n_{cy}=1.511176$. The light source unit 100, the cylinder lens 250 and all the intervening elements are packaged to form a light-source optical unit A1.

Given that the X axis coincides with the optical axis and the Y axis coincides with a direction perpendicular to the optical axis, the mirror surface of the fΘ mirror 41 is a coaxial aspherical surface obtained by rotating a non-arcuate curve $$X=Y^2/[R+R\sqrt{1-(1+K_i)(Y/R)^2}]+A\cdot Y^4+B\cdot Y^6+C\cdot Y^8+D\cdot Y^{10}+$$

around an axis of symmetry, where R indicates a paraxial radius of curvature, and K, A, B, C, D . . . indicate a constant. The non-arcuate curve is defined as R=−405.046, K=−1.46661,
A=3.12269×10$^{-10}$, B=−9.19756×10$^{-15}$,
C=−1.14431×10$^{-18}$, D=−1.39095×10$^{-23}$ The elongated toroidal lens 45 is constructed such that the surface thereof facing the fΘ mirror 41 is a barrel-toroidal surface and the surface facing the scanned surface is a normal toroidal surface.

Given that the x axis coincides with the optical axis and the y axis coincides with a longitudinal direction of the elongated toroidal lens 45 perpendicular to the optical axis, the barrel-toroidal surface is obtained by rotating a non-arcuate curve $$x=y^2/[r_{m1}+r_{M1}\sqrt{1-(1+k)(y/r_{M1})^2}]+a\cdot y^4+b\cdot y^6+c\cdot y^8+d\cdot y^{10}+$$

drawn on a plane that includes the x axis and the y axis, around an axis parallel with the longitudinal direction and removed on the optical axis from the non-arcuate curve by a distance $r_{S1}$ toward the fΘ mirror 41, where $r_{M1}$ indicates a paraxial radius of curvature in the above-mentioned plane, and k, a, b, c, d . . . indicate a constant.

The normal toroidal surface has a radius of curvature $r_{M2}$ on the above-mentioned plane and a radius of curvature $r_{S2}$ on a plane that includes the optical axis and perpendicular to the longitudinal direction.

The configuration of the elongated toroidal lens 45 is defined as $r_{M1}=692.522$, k=−1.7171,
a=−8.45792×10$^{-10}$, b=1.09879×10$^{-14}$,
c=1.47422×10$^{-18}$, d=2.92312×10$^{-23}$,
$r_{S1}=69.2$
$r_{M2}=667.087$, $r_{S2}=30.8$ Further, the thickness $d_{TR}=3.254$ and the refractive index $n_{TR}=1.5721$.

Referring to FIGS. 6A and 6B, intervals $d_1$–$d_5$, $L_0$ and L, a tilt angle $\alpha_{41}$ of the fΘ mirror 41 with respect to the unfolded main-scanning direction, a shift $Z_{41}$ of the fΘ mirror 41 in the unfolded sub-scanning direction, a shift $Z_{45}$ of the elongated toroidal lens 45 in the unfolded sub-scanning direction, and a tilt angle $\alpha_{45}$ of the elongated toroidal lens 45 with respect to the unfolded main-scanning direction, and a tilt angle $\beta_{45}$ of the elongated toroidal lens 45 with respect to the unfolded main-scanning direction have respective values as shown below:

$d_1=12.569$, $d_2=14.46$, $d_3=20$,
$d_4=57.8$, $d_5=122.27$, $L_0=124.179$,
L=105.53, $\alpha_{41}=0.2°$, $Z_{41}=14$,
$Z_{45}=7.6$, $\alpha_{45}=0.05°$, $\beta_{45}=1.280°$ The light source unit 100 according to the first arrangement is a monolithic semiconductor laser array provided with three 780 nm light sources LD1, LD2 and LD3 arranged at an interval of $P_0=14$ μm in the unfolded sub-scanning direction. A light-emitting part of the middle light source LD2 is located on the optical axis of the coupling lens 200.

Figure 7:
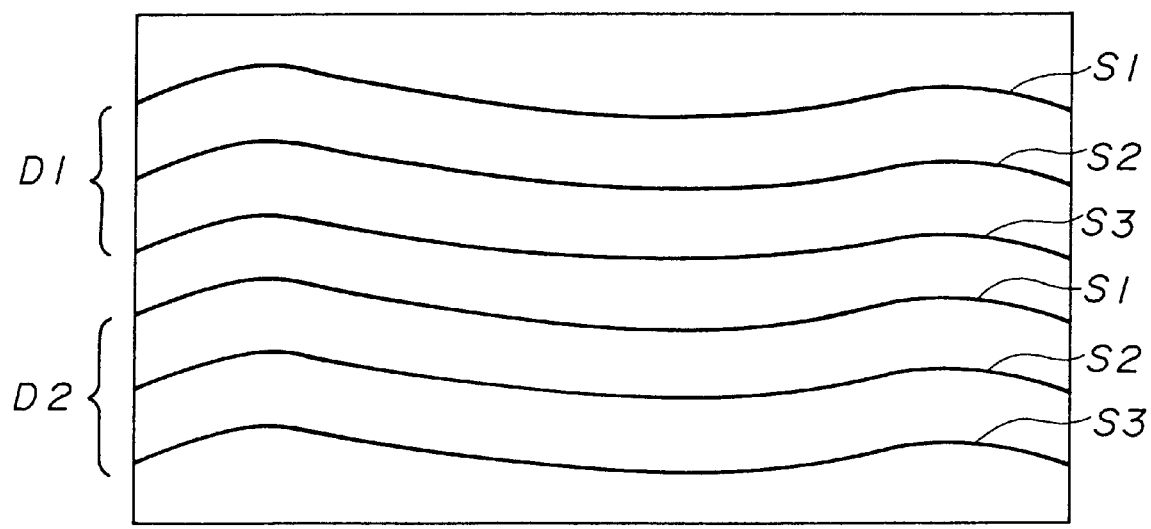
FIG. 7 shows two successive scanning processes each using three scan lines for simultaneously scanning the scanned surface.

FIG. 7 shows two successive scanning processes D1 and D2 each producing three scan lines S1–S3 as a result of simultaneous scanning. As shown in FIG. 7, the three scan lines are bowed in the same direction at any given image height. Given the scan width of 297 mm, the scan line bow ($w_2$ in (C-2) of FIG. 4C) is as small as 25–27 μm. Differential pitch occurring between adjacent scan lines is as small as 1.3–1.6 μm.

It is also to be appreciated that the scan line S3 of the process D1 and the scan line S1 of the subsequent process D2 produce a differential pitch of as small as 2 μm.

Figure 8:
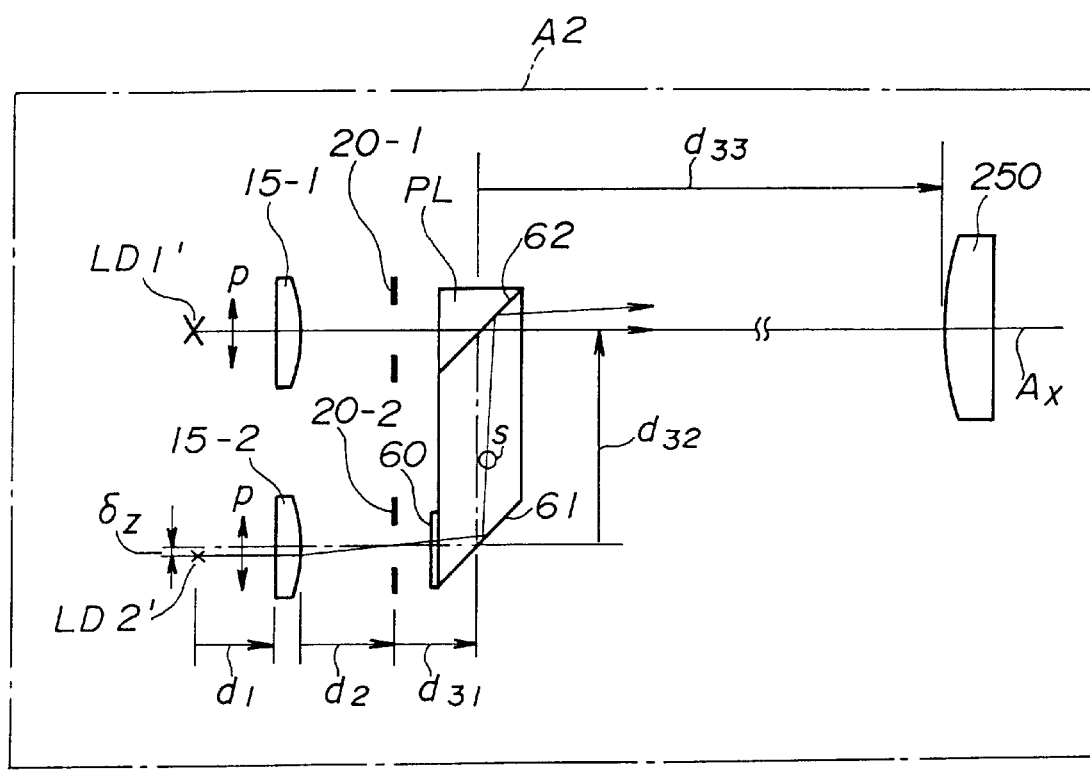
FIG. 8 is a partial unfolded sagittal view of an optical layout according to a second arrangement of the third embodiment.

FIG. 8 shows a second arrangement of the third embodiment. In the second arrangement, the light-source optical unit A1 of the first arrangement shown in FIGS. 6A and 6b is replaced by a light-source optical unit A2. The optical arrangement from the cylinder lens 250 to the scanned surface 500 remains the same.

The light-source optical unit A2 is provided with independent semiconductor lasers LD1' and LD2'. Beams from the semiconductor lasers LD1' and LD2' are transformed into slightly divergent beams by coupling lenses 15-1 and 15-2, respectively. Apertures 20-1 and 20-2 shape respective beams by defining a beam waist.

The beam from the semiconductor laser LD1' is p-polarized. After passing through the aperture 20-1, the p-polarized beam passes through a polarizing and reflecting film 62 of a beam combination prism PL. The beam emitted by the semiconductor laser LD2' and passing through the aperture 20-2 is initially p-polarized and is then transformed into a s-polarized beam after passing through a half-wave plate 60. The s-polarized beam is then reflected internally by a prism surface 61 of the beam combination prism PL, reflected further by the polarizing and deflecting film 62 before exiting the beam combination prism PL.

The coupling lenses 15-1 and 15-2 are arranged such that the respective optical axes are parallel with each other. The beam combination prism PL is aligned with the optical axis Ax of the post-cylinder-lens optic. The light-emitting part of the semiconductor laser LD1' is located to coincide with the optical axis of the coupling lens 15-1 in the unfolded sub-scanning direction (vertical direction in FIG. 9). However, the light-emitting part of the semiconductor laser LD2' is displaced by a small distance δZ from the optical axis of the coupling lens 15-2 in the unfolded sub-scanning direction. For this reason, the beam emitted by the semiconductor laser LD2' and exiting the beam combination prism PL is tilted at a small angle in the unfolded sub-scanning direction with respect to the beam emitted by the semiconductor laser LD1' and exiting the beam combination prism PL. This results in the beam spots isolated from each other in the sub-scanning direction on the scanned surface.

Referring to FIG. 8, distances $d_1$, $d_2$, $d_3$ ($=d_{31}+d_{32}+d_{33}$) and δZ are such that $d_1=12.569$, $d_2=6.0$, $d_3=29$ and δZ=0.0141, the distances $d_1$ and $d_2$ are common to the semiconductor lasers LD1' and LD2'.

Figure 9:
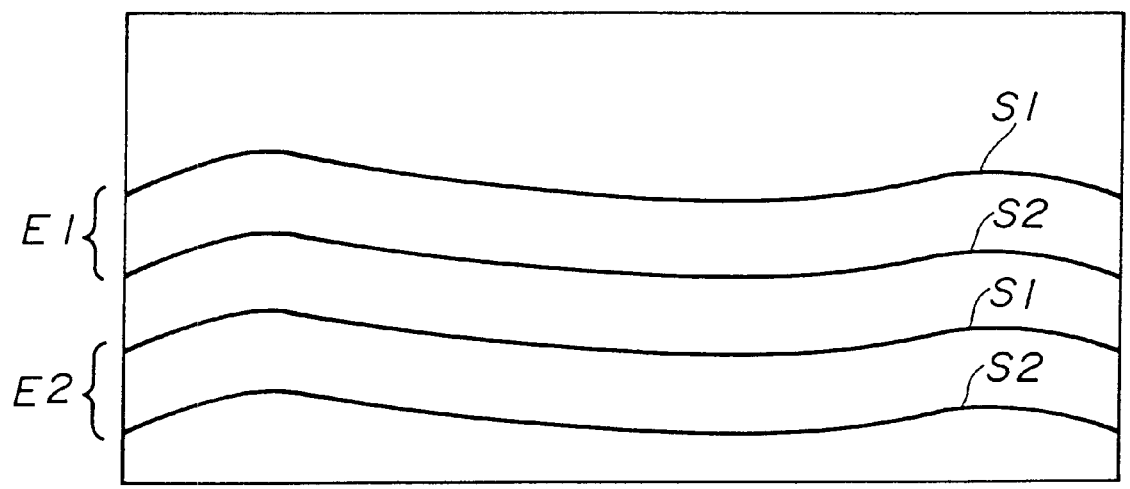
FIG. 9 shows two successive scanning processes each using two scan lines for simultaneously scanning the scanned surface.

FIG. 9 shows two successive scanning processes E1 and E2 each producing two scan lines S1 and S2 as a result of simultaneous scanning. As shown in FIG. 9, the two scan lines are bowed in the same direction at any given image height. Given the scan width of 297 mm, the scan line bow ($w_2$ in (C-2) of FIG. 4C) is as small as 25–27 μm. Differential pitch occurring between adjacent scan lines is as small as 1.2 μm. It is also to be appreciated that the scan line S2 of the process E1 and the scan line S1 of the subsequent process E2 produce a differential pitch of as small as 1 μm.

The present invention is not limited to the above described embodiments, and variations and modifications may be made without departing from the scope of the present invention.

What is claimed is:

1. A multi-beam scanning apparatus comprising:

light source means for emitting a plurality of beams;

beam deflector means for deflecting the plurality of beams from the light source means; and common scanning image-forming optic means for converging the plurality of deflected beams so as to form a plurality of beam spots which simultaneously scan a scanned surface, a plurality of scan lines respectively described by said plurality of beam spots being isolated from each other in a sub-scanning direction, wherein said plurality of scan lines are bowed in the same direction and do not intersect.

2. The multi-beam scanning apparatus as claimed in claim 1, wherein said common image-forming optic means is a lens system.

3. The multi-beam scanning apparatus as claimed in claim 1, wherein said scanning image-forming optic means is provided with a reflecting image-forming element having an image-forming function, said plurality of deflected beams deflected by said common beam deflector means are incident on said reflecting image-forming element and reflected thereby, and said reflecting image-forming element is arranged so that an optical path of a reflecting beam does not overlap an optical path of an incident beam.

4. The multi-beam scanning apparatus as claimed in claim 3, wherein an optical element having a power at least in the sub-scanning direction is provided between the reflecting image-forming element and the scanned surface.

5. The multi-beam scanning apparatus as claimed in claim 1, wherein said plurality of beam spots simultaneously describe mutually adjacent scan lines.

6. A multi-beam scanning apparatus comprising:

a light source unit configured to emit a plurality of beams;

a beam deflector configured to deflect the plurality of beams from the light source unit; and a common scanning image-forming optic configured to converge the plurality of deflected beams so as to form a plurality of beam spots which simultaneously scan a scanned surface, a plurality of scan lines respectively described by said plurality of beam spots being isolated from each other in a sub-scanning direction, wherein said plurality of scan lines are bowed in the same direction.

7. The multi-beam scanning apparatus as claimed in claim 6, wherein said common image-forming optic is a lens system.

8. The multi-beam scanning apparatus as claimed in claim 6, wherein said scanning image-forming optic is provided with a reflecting image-forming element having an image-forming function, so that said plurality of deflected beams deflected by said common beam deflector are incident on said reflecting image-forming element and reflected thereby, said reflecting image-forming element being arranged such that an optical path of a reflecting beam does not overlap an optical path of an incident beam.

9. The multi-beam scanning apparatus as claimed in claim 8, wherein an optical element having a power at least in the sub-scanning direction is provided between the reflecting image-forming element and the scanned surface.

10. The multi-beam scanning apparatus as claimed in claim 6, wherein said plurality of beam spots simultaneously describe mutually adjacent scan lines.

* * * * *